Aug. 13, 1957   A. F. LACKRIE   2,802,267
MEASURING DISH FOR BUTTER AND THE LIKE
Filed Aug. 5, 1955
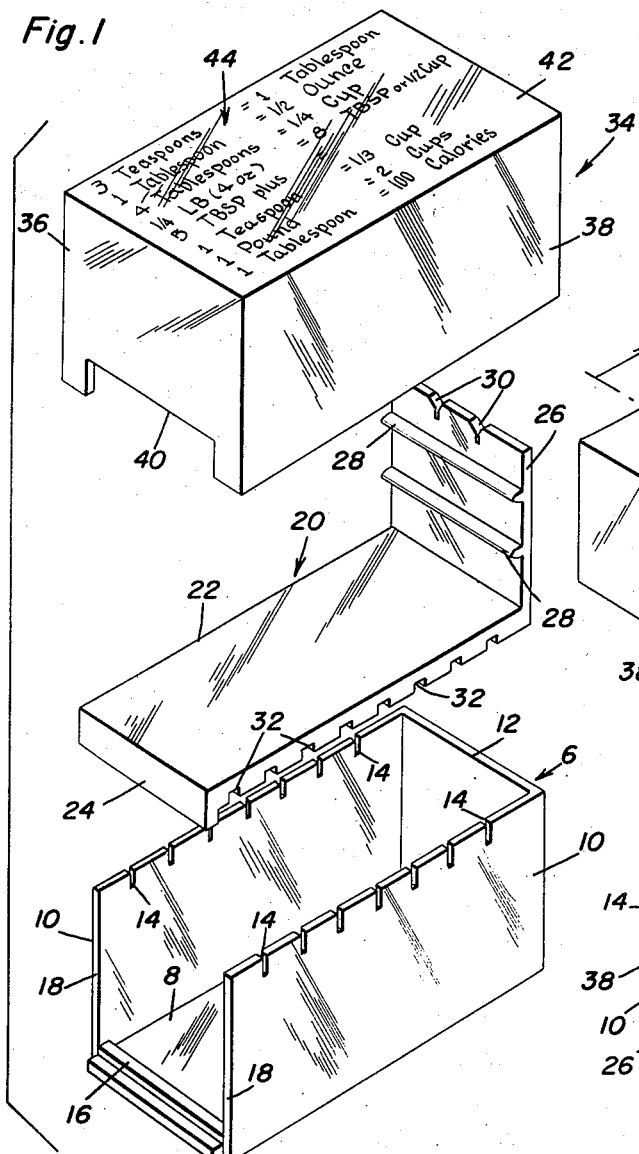
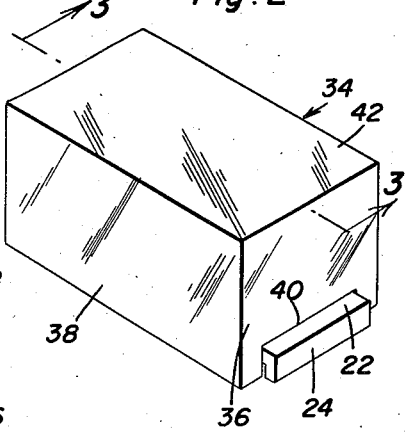
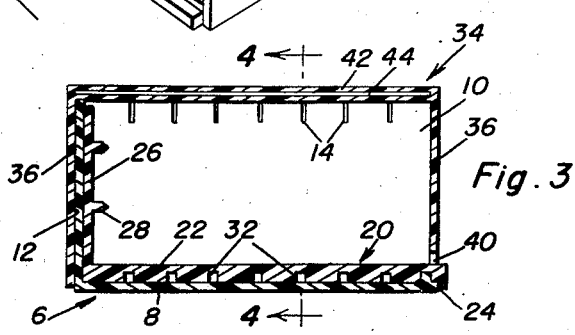
Alice F. Lackrie
INVENTOR.

United States Patent Office 2,802,267
Patented Aug. 13, 1957

2,802,267

MEASURING DISH FOR BUTTER AND THE LIKE

Alice F. Lackrie, San Francisco, Calif.

Application August 5, 1955, Serial No. 526,646

3 Claims. (Cl. 31—17)

The present invention relates to kitchen and table articles, generally speaking, and has more particular reference to an improved dish for measuring accurate amounts of butter, margarine, lard, shortening and the like wherein the same are marketed in so-called block-like prints, for example, those ranging from one-quarter of a pound to one pound.

As the preceding general statement of the subject matter of the invention makes generally clear, butter containing, measuring and slicing dishes are, of course, not new. As a matter of fact, a survey of the art to which the invention relates will enable one to ascertain that there are many and varied styles and forms of measuring-type dishes for butter and the like. It follows, therefore, that it is an object of the present invention to structurally, functionally and otherwise improve upon similarly constructed and performing butter dishes having marking, measuring and slicing facilities.

In carrying out the invention a triple-part sectional dish construction is provided whereby the print or block of butter may be satisfactorily enclosed therein and the preferred construction comprises a first part, namely, a dish of a size to effectually contain and house the stated print in its original or intact form. The dish embodies an elongate horizontal bottom wall, vertical lengthwise side walls and a single transverse vertical end wall which connects corresponding end portions of the lengthwise or side walls. This provides a dish which is wholly open at the top and also open at one end which latter end is used to dispense or project the portion of butter which is then available and is adapted to be sliced off. There is a simple L-shaped or an equivalent tray confined in the dish and this provides a bottom on which to rest a print of butter and also provides an upstanding vertical wall which serves to feed or eject the print of butter through the open end of the dish. In addition, there is a cover which fits over and encloses the dish and tray.

Novelty is predicated on the specific construction of the dish, the manner in which the tray is constructed to cooperate with portions of the dish and an appropriate cover which lends itself to proper use in conjunction with the dish and tray.

Other objects and features and advantages will become more readily apparent from the following description and the accompanying sheet of illustrative drawings.

In the drawings, wherein like numerals are employed to designate like parts throughout the views:

Figure 1 is an exploded perspective view showing the several components of parts which go to make up the over-all butter containing, feeding and measuring dish.

Figure 2 is a perspective view showing the complete ready-to-use dish.

Figure 3 is a lengthwise section taken approximately on the plane of the line 3—3 of Figure 2 looking in the direction of the arrows; and Figure 4 is a cross section on the vertical line 4—4 of Figure 3.

Referring now to the drawing and especially to Figure 1 the parts are preferably transparent moldable plastic or an equivalent material which may be thoroughly washed and cleaned for sanitary purposes and for economical manufacture and sale. The part known as the dish is denoted by the numeral 6 and is of general rectangular form and comprises a horizontal bottom wall 8, a pair of vertically upstanding spaced parallel lengthwise or side walls 10 and an intervening vertical transverse end wall. This is located between the right-hand ends of the walls 10 and provides a box-like receptacle which is completely open at the top and also at the left-hand end, the end opposite to the wall 12. The upper edges of the walls 10 are provided with opposed pairs of longitudinally spaced notches or kerfs 14 which are adapted to receive the blade of a knife or the like for marking the top of the print of the butter in an obvious manner. These notches are prescribed distances from each other. It will be noted too that there is a transverse rib 16 provided at the open end of the dish and this lines up with the forward edges 18 which edges are used as knife guides and abutments when slicing the projected portion of butter in a reasonably obvious manner. The rib serves as a keeper and will be later clarified.

The interior separately constructed and removable tray is denoted by the numeral 20. It is of L-shaped form in edge elevation and it comprises a smooth bottom horizontal wall 22 having a depending finger-gripping lip and stop 24 at its left hand or outer end. At the opposite end there is an upstanding integral vertical wall 26 which is adapted to abut the wall 12 when the tray is fully embedded as shown in Figure 3. This serves as a follower and obviously functions to deliver the print of butter (not shown) in a step-by-step manner. On the leading surface I provide a pair of ribs or equivalent projections 28 and these facilitate anchoring the cooperating end of the butter print and guard against accidental slippage. The upper edge of the wall is provided with suitably arranged additional notches or kerfs 30. In addition, and this is important, the underneath side of the bottom 22 is provided with transverse longitudinally spaced grooves 32 which serve as keepers and also function to seat the keeper rib 16.

The cover which is preferably transparent is of inverted box-like form and is denoted by the numeral 34 and it comprises end walls 36 and interconnecting side walls 38. The front end wall is provided with a clearance notch 40 which serves to clear the projecting end portion of the slidable tray as brought out in Figures 2 and 3. The top wall is denoted at 42 and embedded or otherwise mounted therein is a plate or the like 44 the exposed surface of which is printed or otherwise constructed to provide a reference chart. This is substantially self-explanatory. It might be added however that the reading material on the chart presents itself as follows:

3 teaspoons equal 1 tablespoon
1 tablespoon equals ½ ounce
4 tablespoons equal ¼ cup
¼ lb. (4 oz.) equal 8 tablespoons or ½ cup
5 tablespoons plus 1 teaspoon equal ⅓ cup
1 pound equals 2 cups
1 tablespoon equals 100 calories.

The grooves 32 are distanced one tablespoon apart, so to speak. They are constructed to receive the keying or keeper rib 16. Each notch 30 represents a teaspoon marking point. A score line can be made with a knife blade at these points in an obvious manner. As stated the ribs 28 which are preferably V-shaped in cross section provide anchoring elements and the shortening is pressed into the rib and the latter serves to prevent slipping of the print. The notches 14 may be described as being one tablespoon apart. If one tablespoon is desired one needs but to pull the tray 20 forward and to cut off the projecting portion. If two or more tablespoonfuls are desired, a knife is placed across the intended or desired measuring kerfs 14 and then the tray is pulled forward a corresponding distance. This distance is ascertained and maintained by the cooperation of the grooves 32 and the keeper rib 16 fitting into the same. Therefore, when the tray is pulled out a prescribed distance in accordance with the marking already ascertained, the tray stays put. Then the edges 18 facilitate slicing the pat or portion in a quick, easy and reliable manner.

What with the fact that the over-all construction is of the utmost in simplicity and economy it will be seen that it constitutes a structural adaptation in which manufacturers will find their manufacturing requirements suitably met and users will find their every-day kitchen needs likewise effectually met.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention claimed.

What is claimed as new is as follows:

1. For use in accurately measuring and slicing off pat-like portions of a print of butter, a measuring dish construction comprising a dish of a size to effectually contain and house the stated print in intact form, said dish embodying an elongate horizontal bottom wall, vertical lengthwise side walls and a single transverse vertical end wall between the side walls at the same ends of the side walls, said dish being wholly open at the top and also open at the end opposite to said end wall, the upper edges of said side walls having opposed longitudinally spaced knife receiving and measuring kerfs at prescribed distances apart and adapted to enable the user to employ a knife or the like in scoring and marking the top surface of said print in a manner to designate the size of the portion to be projected beyond the open end of the dish for slicing, a print seating, holding and dispensing tray slidingly mounted and normally confined, for the most part, in said dish and adapted to be progressively slid through said open end the distance intended and desired to expedite slicing off the needed amount, said tray being L-shaped in edge elevation and thus characterized by a horizontal bottom resting on the bottom wall of the dish and a single vertical end wall providing a print feeding and follower member, the upper edge of said follower wall having selectively usable marker kerfs and the vertical leading surface of said follower wall having outstanding projections which embed themselves in the stated print and assist in positioning and holding the print in cooperative relation with said tray.

2. The structure defined in claim 1, and wherein the underneath side of said tray bottom has transverse longitudinally spaced keeper grooves therein and situated at prescribed distances corresponding with the distances between said kerfs, said grooves being of a length equal to the width of said bottom and being open-ended, the bottom wall of said dish having a fixed keeper rib adjacent to the open end of the dish and said rib being adapted to seat itself in one of said keeper grooves so that the tray and print stay put during the slicing step.

3. For use in accurately measuring and slicing off pat-like portions of a print of butter, a measuring dish construction comprising a dish of a size to effectually contain and house the stated print in intact form, said dish embodying an elongated horizontal bottom wall, vertical lengthwise side walls and a single transverse vertical end wall between the side walls at the same ends of the side walls, said dish being wholly open at the top and also open at the end opposite to said end wall, the upper edges of said side walls having opposed longitudinally spaced knife receiving and measuring kerfs at prescribed distances apart and adapted to enable the user to employ a knife or the like in scoring and marking the top surface of said print in a manner to designate the size of the portion to be projected beyond the open end of the dish for slicing, a print seating, holding and dispensing tray slidingly mounted and normally confined, for the most part, in said dish and adapted to be progressively slid through said open end the distance intended and desired to expedite slicing off the needed amount, said tray being L-shaped in edge elevation and thus characterized by a horizontal bottom resting slidingly atop the bottom wall of said dish and a single vertical end wall providing a print feeding and follower member and shiftable toward and from the aforementioned vertical end wall, the underneath side of said tray bottom having longitudinally spaced transversely disposed keeper grooves therein, said grooves being of a length equal to the width of said bottom and opening through the lengthwise edges of said bottom, the bottom wall of said dish having an upstanding keeper rib situated adjacent to the open end of the dish and said grooves being selectively and releasably engageable with said rib so that the tray may be caused to remain in any predetermined tray adjusting position.

References Cited in the file of this patent

UNITED STATES PATENTS

| | | |
|---|---|---|
| 865,447 | Stewart | Sept. 10, 1907 |
| 1,438,870 | Smith | Dec. 12, 1922 |
| 2,232,918 | Keefer | Feb. 25, 1941 |